(12) United States Patent
Bai et al.

(10) Patent No.: US 11,180,152 B1
(45) Date of Patent: Nov. 23, 2021

(54) FUEL EFFICIENCY BASED INTEGRATED ENGINE FIRING FRACTION AND TRANSMISSION RATIO SELECTION

(71) Applicant: GM GLOBAL TECHNOLOGY OPERATIONS LLC, Detroit, MI (US)

(72) Inventors: Shushan Bai, Ann Arbor, MI (US); Nathan M. Picot, Farmington Hills, MI (US); Brandon M. Fell, Milford, MI (US); Gregory M. Wilson, Canton, MI (US); Ning Jin, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/065,953

(22) Filed: Oct. 8, 2020

(51) Int. Cl.
| | |
|---|---|
| *B60W 30/18* | (2012.01) |
| *B60W 10/10* | (2012.01) |
| *B60W 10/06* | (2006.01) |
| *F02D 41/24* | (2006.01) |
| *F02D 17/02* | (2006.01) |

(52) U.S. Cl.
CPC ...... *B60W 30/18181* (2013.01); *B60W 10/06* (2013.01); *B60W 10/10* (2013.01); *F02D 17/02* (2013.01); *F02D 41/2406* (2013.01); *B60W 2510/0623* (2013.01); *B60W 2510/0638* (2013.01); *B60W 2510/0657* (2013.01); *B60W 2510/104* (2013.01); *B60W 2510/1005* (2013.01); *B60W 2710/0627* (2013.01); *B60W 2710/0666* (2013.01); *B60W 2710/0677* (2013.01); *B60W 2710/1005* (2013.01)

(58) Field of Classification Search
CPC .......... B60W 10/06; B60W 10/10; B60W 30/18181; B60W 30/12; B60W 30/188; B60W 2510/0623; B60W 2510/0638; B60W 2510/0657; B60W 2510/1005; B60W 2510/104; B60W 2710/0627; B60W 2710/0666; B60W 2710/0677; B60W 2710/1005; F02D 17/02; F02D 41/2406

See application file for complete search history.

(56) References Cited

U.S. PATENT DOCUMENTS

| | | | | |
|---|---|---|---|---|
| 2015/0260117 | A1* | 9/2015 | Shost | F02D 17/02 123/481 |
| 2016/0146138 | A1* | 5/2016 | Beikmann | F02D 41/0087 701/54 |
| 2018/0105158 | A1* | 4/2018 | Namuduri | B60W 30/18127 |
| 2019/0184959 | A1* | 6/2019 | Cao | G06K 9/00362 |

* cited by examiner

*Primary Examiner* — Edwin A Young
(74) *Attorney, Agent, or Firm* — Harness, Dickey & Pierce, P.L.C.

(57) ABSTRACT

A fuel management system includes a memory and a control module. The memory stores fuel rate maps for multiple firing fractions, where: each of the firing fractions corresponds to a respective firing pattern of an engine; at least some of the firing patterns include deactivating one or more cylinders. The control module: for each of the firing fractions, determines a fuel efficiency value for each of multiple transmission gear ratios, where fuel efficiency values are provided for transmission ratio and firing fraction pairs; applies drive ability constraints to provide resultant transmission ratio and firing fraction pairs; subsequent to applying the drive ability constraints and based on the fuel efficiency values, selects one of the resultant transmission ratio and firing fraction pairs; and concurrently operates a transmission and the engine according to the selected one of the transmission ratio and firing fraction pairs.

20 Claims, 5 Drawing Sheets

FUEL EFFICIENCY BASED INTEGRATED ENGINE FIRING FRACTION AND TRANSMISSION RATIO SELECTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to active and dynamic fuel management systems of a vehicle.

Coordinated torque control systems are used to control engine and transmission output torques to satisfy various torque demands of a vehicle. Full authority active fuel management (FAAFM) and dynamic fuel management (DFM) systems coordinate deactivation of one or more selected cylinders of an engine to improve fuel economy. The fuel management systems determine, based on fuel economy, which cylinders to deactivate while satisfying torque demands. Cylinder deactivation may include closing and/or disabling movement of intake and exhaust valves and disabling spark and supply of fuel to the deactivated cylinders.

SUMMARY

A fuel management system is provided and includes a memory and a control module. The memory is configured to store m fuel rate maps respectively for m firing fractions, where: each of the m firing fractions corresponds to a respective firing pattern for cylinders of an engine of a vehicle; at least some of the firing patterns include deactivating one or more of the cylinders; and where m is an integer greater than or equal to two. The control module is configured to: for each of the m firing fractions, determine a fuel efficiency value for each of n transmission gear ratios, where n*m fuel efficiency values are provided for n*m transmission ratio and firing fraction pairs; applying drive ability constraints to the n*m transmission ratio and firing fraction pairs to provide resultant transmission ratio and firing fraction pairs; subsequent to applying the drive ability constraints and based on the fuel efficiency values of the resultant transmission ratio and firing fraction pairs, select one of the resultant transmission ratio and firing fraction pairs; and concurrently operate a transmission and the engine according to the selected one of the transmission ratio and firing fraction pairs.

In other features, the control module is configured to select the one of the resultant transmission ratio and firing fraction pairs based on a cost function, which is directly related to fuel efficiency. The cost function is based on a fuel rate, an engine power, and a transfer efficiency.

In other features, the control module is configured to: for each of the m firing fractions, determine a transfer efficiency value for each of the n transmission gear ratios; and determine each of the n*m fuel efficiency values based on a respective one of the transfer efficiency values.

In other features, the control module is configured to determine each of the transfer efficiency values based on a respective engine speed and engine torque pair.

In other features, the control module is configured to: for each of the m firing fractions, determine a fuel rate for each of the n transmission gear ratios; and determine each of the n*m fuel efficiency values based on a respective one of the fuel rates.

In other features, the control module is configured to determine each of the fuel rates based on a respective one of multiple engine speed and engine torque pairs.

In other features, the control module is configured to: in response to determining one of the engine speed and engine torque pairs is outside of an operable range, assign a predetermined default fuel rate value for a corresponding one of the n*m transmission ratio and firing fraction pairs; and refrain from selecting the one of the n*m transmission ratio and firing fraction pairs based on the predetermined default fuel rate value.

In other features, the control module is configured to: for each of the m firing fractions, determine an engine speed and engine torque pair for each of the n transmission gear ratios; determine a transfer efficiency value for each of the engine speed and engine torque pairs; and determine the n*m fuel efficiency values based respectively on the transfer efficiency values.

In other features, the control module is configured to: determine a turbine speed and turbine torque pair of a torque converter for each of the n transmission gear ratios; for each of the m firing fractions and based on an amount of torque converter slip and the turbine speed and turbine torque pairs, determine an engine speed and engine torque pair for each of the n transmission gear ratios; determine a transfer efficiency value for each of the engine speed and engine torque pairs; and determine the n*m fuel efficiency values based respectively on the transfer efficiency values.

In other features, the drive ability constraints include at least one of: limiting output torque to a maximum amount of engine output torque; limiting, for each of the m firing fractions, engine speed to be within a range between a minimum engine speed and a maximum engine speed; preventing concurrent deactivation of a predetermined combination of the cylinders; preventing a predetermined order of activating selected ones of the cylinders; or preventing a predetermined order of deactivating selected ones of the cylinders.

In other features, a fuel management method is provided and includes: storing in a memory m fuel rate maps respectively for m firing fractions, where: each of the m firing fractions corresponds to a respective firing pattern for cylinders of an engine of a vehicle; where at least some of the firing patterns include deactivating one or more of the cylinders; and where m is an integer greater than or equal to two. The method further includes: for each of the m firing fractions, determining a fuel efficiency value for each of n transmission gear ratios, where n*m fuel efficiency values are provided for n*m transmission ratio and firing fraction pairs; applying drive ability constraints to the n*m transmission ratio and firing fraction pairs to provide resultant transmission ratio and firing fraction pairs; subsequent to applying the drive ability constraints and based on the fuel efficiency values of the resultant transmission ratio and firing fraction pairs, selecting one of the resultant transmission ratio and firing fraction pairs; and concurrently operating a transmission and the engine according to the selected one of the transmission ratio and firing fraction pairs.

In other features, the fuel management method further includes selecting the one of the resultant transmission ratio and firing fraction pairs based on a cost function, which is directly related to fuel efficiency. The cost function is based on a fuel rate, an engine power, and a transfer efficiency.

In other features, the fuel management method further includes: for each of the m firing fractions, determining a transfer efficiency value for each of the n transmission gear ratios; and determining each of the n*m fuel efficiency values based on a respective one of the transfer efficiency values.

In other features, the fuel management method further includes determining each of the transfer efficiency values based on a respective engine speed and an engine torque pair.

In other features, the fuel management method further includes: for each of the m firing fractions, determining a fuel rate for each of the n transmission gear ratios; and determining each of the n*m fuel efficiency values based on a respective one of the fuel rates.

In other features, the fuel management method further includes determining each of the fuel rates for a respective one of multiple engine speed and engine torque pairs.

In other features, the fuel management method further includes: in response to determining one of the engine speed and engine torque pairs is outside of an operable range, assigning a predetermined default fuel rate value for a corresponding one of the n*m transmission ratio and firing fraction pairs; and refraining from selecting the one of the n*m transmission ratio and firing fraction pairs based on the predetermined default fuel rate value.

In other features, the fuel management method further includes: for each of the m firing fractions, determining an engine speed and engine torque pair for each of the n transmission gear ratios; determining a transfer efficiency value for each of the engine speed and engine torque pairs; and determining the n*m fuel efficiency values based respectively on the transfer efficiency values.

In other features, the fuel management method further includes: determining a turbine speed and turbine torque pair of a torque converter for each of the n transmission gear ratios; for each of the m firing fractions and based on an amount of torque converter slip and the turbine speed and turbine torque pairs, determining an engine speed and engine torque pair for each of the n transmission gear ratios; determining a transfer efficiency value for each of the engine speed and engine torque pairs; and determining the n*m fuel efficiency values based respectively on the transfer efficiency values.

In other features, the drive ability constraints include at least one of: limiting output torque to a maximum amount of engine output torque; limiting, for each of the m firing fractions, engine speed to be within a range between a minimum engine speed and a maximum engine speed; preventing concurrent deactivation of a predetermined combination of the cylinders; preventing a predetermined order of activating selected ones of the cylinders; or preventing a predetermined order of deactivating selected ones of the cylinders.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A fuel management system of a vehicle may select a transmission gear and a firing fraction of an engine to improve fuel efficiency. The engine firing fraction refers to a cylinder firing pattern. A cylinder firing pattern is indicative of which cylinders are activated and deactivated and the firing order and timing of the activated cylinders during a firing cycle of the engine. A cylinder is activated when fuel and spark for the cylinder are enabled and intake and exhaust valves of the cylinder are active (i.e. enabled to move). A cylinder is deactivated when fuel and spark are disabled. While a cylinder is deactivated, the intake and exhaust valves of that cylinder may be (i) disabled, (ii) held closed, or (iii) enabled and open and close while air is being pumped in and out of the deactivated cylinder. A firing cycle of a four stroke engine refers to two cycles of a crankshaft and the spark and no spark pattern of the cylinders of the engine.

As an example, in an eight cylinder engine, a ½ engine firing fraction may be implemented, where four cylinders are deactivated and the other four cylinders are activated for each firing cycle of the engine. The firing pattern corresponding to the ½ engine firing fraction may repeat every two firing cycles of the engine. The same or different cylinders may be activated during each firing pattern cycle of the engine. As another example, a ⅓ engine firing fraction may be implemented with a firing pattern that may repeat every three firing cycles. During each firing cycle, three cylinders are activated and five cylinders are deactivated. Different cylinders may be activated during each of the three firing cycles. For an eight cylinder engine, there are numerous possible cylinder firing fractions and firing patterns, especially for a fuel management system that is capable of activating and deactivating each cylinder independently.

Traditionally, a transmission gear and an engine firing fraction are selected separately. The transmission gear is selected using a traditional shift map that includes selecting a transmission gear based on, for example, a requested engine output torque and engine speed. The engine firing fraction is subsequently selected to minimize fuel rate while satisfying hysteresis and shift ability constraints. Hysteresis constraints are implemented to minimize frequency of shifting between firing fractions. Shift ability constraints refer to limitations imposed to minimize noise and vibrations and maintain operating stability. Examples of shift ability constraints include, for a specific transmission gear, maximum torque values and minimum and maximum engine speed limits.

Figure 1B:
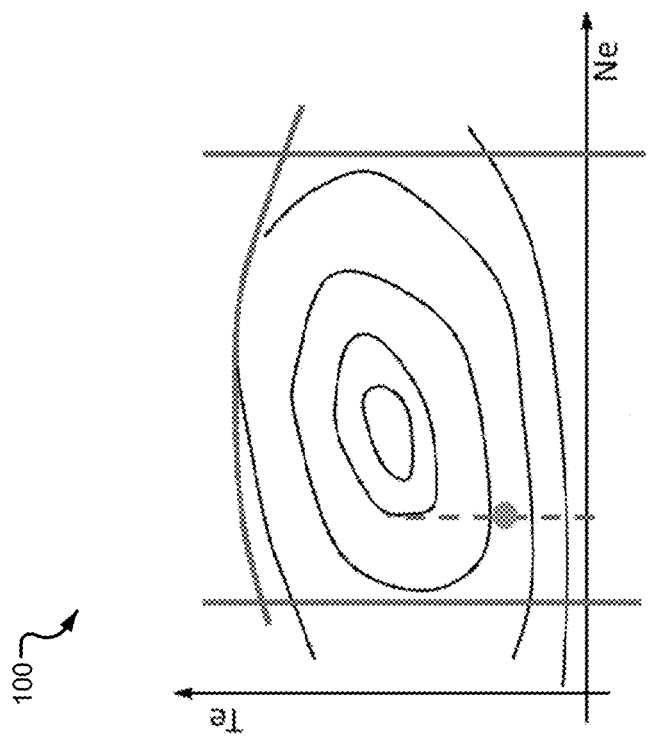
FIG. 1B is an example brake specific fuel consumption map for a second firing fraction.
Figure 1A:
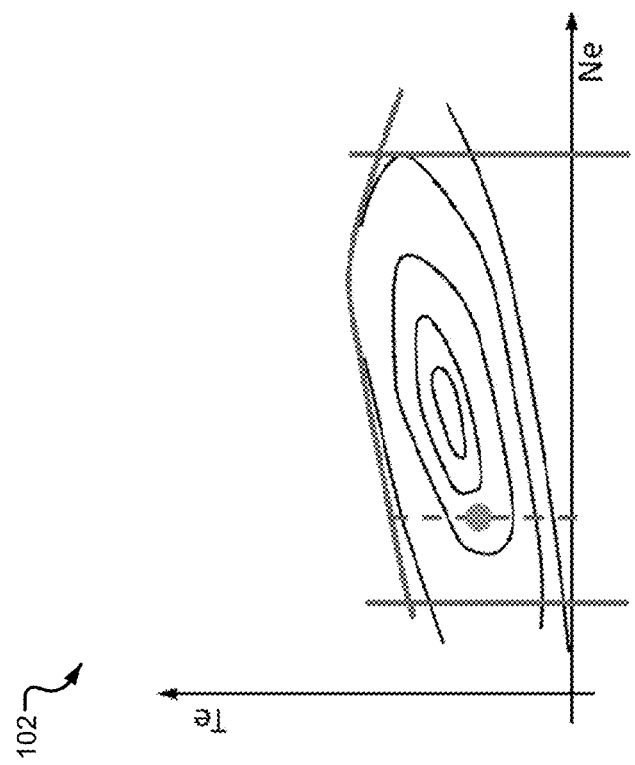
FIG. 1A is an example brake specific fuel consumption map for a first firing fraction.

FIGS. 1A and 1B show example brake specific fuel consumption (BSFC) maps 100, 102 for a first firing fraction (FF) (e.g., FF=1) and a second FF (e.g., FF-½). A BSFC map is a plot of engine torque for engine speed including irregularly shaped rings having a common center point. Points along each ring represent a same fuel efficiency. Each BSFC value is equal to a fuel flow rate divided by a torque for a given engine speed. The closer to the center point, the better the fuel efficiency. The map also illustrates a maximum torque constraint curve Te_max and minimum and maximum engine speed limits Ne_min and Ne_max. The parameter Te refers to torque in newton-meters (nm). Ne may refer to engine speed in revolutions-per-minute (RPM). The points of the BSFC map refer to amounts of fuel per unit torque. For the example of FIGS. 1A and 1B, since both of the firing fractions of 1 and ½ satisfy the requested torque and imposed constraints, the ½ firing fraction may be selected over the 1 firing fraction, due to the better fuel efficiency provided by the ½ firing fraction. The traditional approach provides a limited number of transmission gear (or ratio) and firing fraction pairs to select from and thus limits the fuel economy achieved.

The examples set forth herein include a fuel management system that increases the transmission ratio and firing fraction pairs available (referred to as the optimization space) and performs a process to concurrently select a transmission ratio and firing fraction for improved fuel economy. The selected transmission ratio may refer to a transmission ratio associated with a selected transmission gear and/or a speed ratio of a rotational input speed of an input shaft (or input gear) of the transmission to a rotational output speed of an output shaft (or output gear) of the transmission. The disclosed process may be referred to as a global optimization process.

Figure 2:
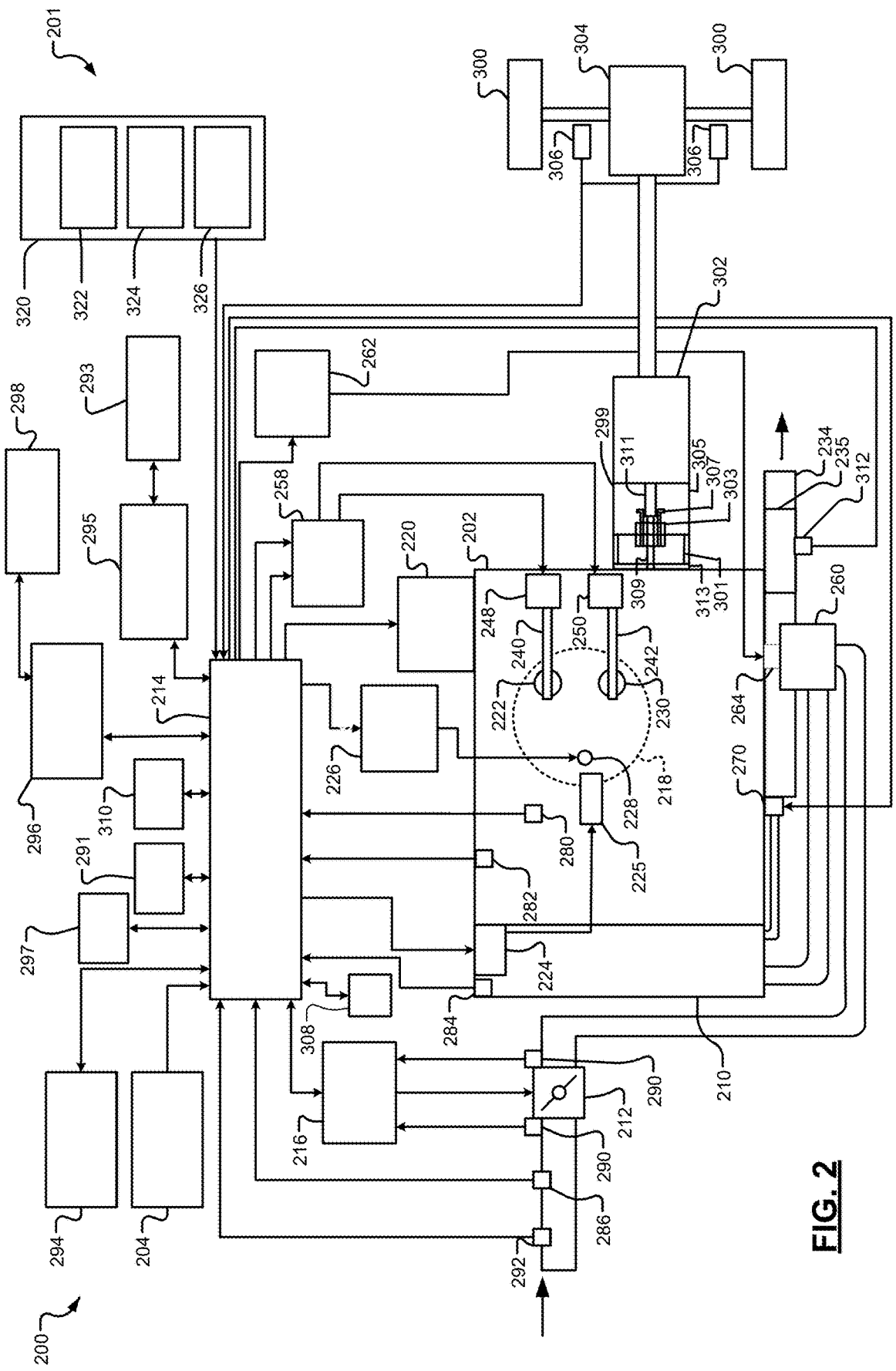
FIG. 2 is a functional block diagram of an exemplary coordinated torque control (CTC) system including a fuel management system in accordance with the present disclosure.

FIG. 2 is a function block diagram of an exemplary coordinated torque control (CTC) system 200 including a fuel management system 201. The CTC system 200 may be configured for a hybrid electric vehicle and/or an internal combustion engine (e.g., a spark injection direct injection (SIDI) engine). Although the following embodiment is directed to a hybrid vehicle, the embodiments disclosed herein may be applied to non-hybrid vehicles. The CTC system 200 includes an engine 202 that combusts an air/fuel mixture to produce drive torque for a vehicle based on a driver input module 204. Air is drawn into an intake manifold 210 through a throttle valve 212. A CTC (or engine) control module 214 commands a throttle actuator module 216 to regulate opening of the throttle valve 212 to control the amount of air drawn into the intake manifold 210. Air from the intake manifold 210 is drawn into cylinders of the engine 202. The engine 202 may include any number of cylinders. The CTC module 214 may elect a firing pattern and instruct a cylinder actuator module 220 to selectively deactivate and activate the cylinders according to the firing pattern to improve fuel economy.

Air from the intake manifold 210 is drawn into the cylinder 218 through an intake valve 222. The CTC module 214 controls the amount of fuel injected by a fuel injection system 224 that includes one or more fuel injectors 225. The fuel injection system 224 may inject fuel into the intake manifold 210 at a central location or may inject fuel into the intake manifold 210 at multiple locations, such as near the intake valve of each of the cylinders. Alternatively, the fuel injection system 224 may inject fuel directly into the cylinders, as shown.

The injected fuel mixes with the air and creates the air/fuel mixture in the cylinder 218. A piston (not shown) within the cylinder 218 compresses the air/fuel mixture. Based upon a signal from the CTC module 214, a spark actuator module 226 energizes a spark plug 228 in the cylinder 218, which ignites the air/fuel mixture. The timing of the spark may be specified relative to the crankshaft angle when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 230. The byproducts of combustion are exhausted from the vehicle via an exhaust system 234. Exhaust passes through a catalyst 235.

The intake valve 222 may be controlled by an intake camshaft 240, while the exhaust valve 230 may be controlled by an exhaust camshaft 242. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 220 may deactivate cylinders by halting provision of fuel and spark and/or disabling their exhaust and/or intake valves.

A CTC module 214 may regulate the position of the intake valve 222 and/or the exhaust valve 230 to regulate the quantity of air ingested and inert residual gases retained in the cylinder(s) 218. The CTC module 214 may also adjust operation of the fuel injector(s) 225, such as ON time or size of injector openings, to increase the amount of fuel injected into the cylinder(s) 218. The CTC module 214 may also adjust the timing of the exhaust camshaft(s) corresponding to the change in the A/F mixture.

The crankshaft angle at which the intake valve 222 is opened may be varied with respect to piston TDC by an intake cam phasor 248. The crankshaft angle at which the exhaust valve 230 is opened may be varied with respect to piston TDC by an exhaust cam phasor 250. A phasor actuator module 258 controls the intake cam phasor 248 and the exhaust cam phasor 250 based on signals from the CTC module 214.

The CTC system 200 may include a boost device that provides pressurized air to the intake manifold 210. For example, FIG. 1 depicts a turbocharger 260. The turbocharger 260 is powered by exhaust gases flowing through the exhaust system 234, and provides a compressed air charge to the intake manifold 210. The turbocharger 260 may compress air before the air reaches the intake manifold 210.

A wastegate 264 may allow exhaust gas to bypass the turbocharger 260, thereby reducing the turbocharger's output (or boost). The CTC module 214 controls the turbocharger 260 via a boost actuator module 262. The boost actuator module 262 may modulate the boost of the turbocharger 260 by controlling the position of the wastegate 264. The compressed air charge is provided to the intake manifold 210 by the turbocharger 260. An intercooler (not shown) may dissipate some of the compressed air charge's heat, which is generated when air is compressed and may also be increased by proximity to the exhaust system 234. Alternate engine systems may include a supercharger that provides compressed air to the intake manifold 210 and is driven by the crankshaft.

The CTC system 200 may include an exhaust gas recirculation (EGR) valve 270, which selectively redirects exhaust gas back to the intake manifold 210. In various implementations, the EGR valve 270 may be located after the turbocharger 260. The CTC system 200 may measure the speed of the crankshaft in revolutions per minute (RPM) using an engine speed sensor 280. The temperature of the engine coolant may be measured using an engine coolant temperature (ECT) sensor 282. The ECT sensor 282 may be located within the engine 202 or at other locations where the coolant is circulated, such as a radiator (not shown).

The pressure within the intake manifold 210 may be measured using a manifold absolute pressure (MAP) sensor 284. In various implementations, engine vacuum may be measured, where engine vacuum is the difference between ambient air pressure and the pressure within the intake manifold 210. The mass of air flowing into the intake manifold 210 may be measured using a mass air flow (MAF) sensor 286. The MAF sensor 286 may be located in a housing that includes the throttle valve 212.

The throttle actuator module 216 may monitor the position of the throttle valve 212 using one or more throttle position sensors (TPS) 290. The ambient temperature of air being drawn into the CTC system 100 may be measured using an intake air temperature (IAT) sensor 292. The CTC module 214 may use signals from the sensors to make control decisions for the CTC system 200.

The CTC module 214 may communicate with a transmission control module 294 to coordinate shifting gears in a transmission (not shown). For example, the CTC module 214 may reduce torque during a gear shift. The CTC module 214 may communicate with a hybrid control module 296 to coordinate operation of the engine 202 and an electric motor 298. The electric motor 298 may also function as a generator, and may be used to produce electrical energy for use by vehicle electrical systems and/or for storage in a battery. In various implementations, the CTC module 214, the transmission control module 294, and the hybrid control module 296 may be integrated into one or more modules.

To abstractly refer to the various control mechanisms of the engine 202, each system that varies an engine parameter may be referred to as an actuator. For example, the throttle actuator module 216 can change the blade position, and therefore the opening area, of the throttle valve 212. The throttle actuator module 216 can therefore be referred to as an actuator, and the throttle opening area can be referred to as an actuator position.

Similarly, the spark actuator module 226 can be referred to as an actuator, while the corresponding actuator position is an amount of spark advance. Other actuators include the boost actuator module 262, the EGR valve 270, the phasor actuator module 258, the fuel injection system 224, and the cylinder actuator module 220. The term actuator position with respect to these actuators may correspond to boost pressure, EGR valve opening, intake and exhaust cam phasor angles, air/fuel ratio, and number of cylinders activated, respectively.

While electric motor 298 may provide torque in series and/or in parallel with the torque output of engine 202, it should be appreciated that other configurations are also contemplated to be within the scope of this description. For example, electric motor 298 may be implemented as one or more electric motors that provide torque directly to wheels 300 instead of passing through a transmission 302.

The torque of engine 202 and optionally the electric motor 298 may be applied to a torque converter 299 including a turbine 301, a stator 303, a pump (or impellar) 305, a clutch 307, an input shaft 309 and an output shaft 311. The turbine may be connected to a flywheel 313 of the engine 202. Slip of the clutch is associated with how much the input shaft 309 is engaged to drive the output shaft 311. The output shaft 311 is connected to the transmission 302. The transmission 302 may be an automatic transmission that switches gears in accordance with a gear change command from the CTC module 214. The transmission 302 may have any number of gears with respective transmission gear ratios (or simply transmission ratios). In one embodiment, the transmission is a continuously variable transmission (CVT) that is able to seamlessly transition through a continuous range of gear ratios. An output shaft of transmission 302 is coupled to an input of a differential gear 304. Differential gear 304 drives axles and wheels 300. Wheel speed sensors 306 generate signals that indicate a rotation speed of their respective wheels 300.

The CTC module 214 estimates an engine output torque to provide based on received sensor signals and other parameters described herein. The CTC module 214 may adjust position of the throttle, air-fuel ratio, valve timing, fuel injection, etc. to provide the estimated engine output torque. Based on a desired engine output torque, the CTC module 214 controls engine devices such that a desired air flow, a desired fuel injection, and/or a desired spark timing is achieved. The desired engine output torque may be based on a vehicle operator (driver) request and/or may be controller based, such as a torque output request from a cruise control system. In particular, the CTC module 214 controls the torque output of the engine based on the coordinated torque control methods and systems of the present disclosure.

The sensor signals that are received by the CTC module 214 may include sensor signals from: the MAP sensor 284, the MAF sensor 286, the throttle position sensor 290, the IAT sensor 292, an accelerator pedal position sensor 295, or other sensors, such as the engine coolant temperature sensor 282, the engine speed sensor 280, an ambient temperature sensor 297, an oil temperature sensor 291, and a vehicle speed sensor 310, an exhaust or catalyst temperature sensor 312.

The CTC module 214 communicates with the throttle actuator module 216 and a cruise control module. The CTC module 214 receives a throttle position signal from the throttle position sensor 290 and adjusts throttle position based on the throttle position signal. The CTC module 214 may control the throttle 212 using a throttle actuator based on a position of an accelerator pedal 293. The throttle actuator module 216 may include a motor or a stepper motor, which provides limited and/or coarse control of the throttle position.

The CTC module 214 may also control the throttle 212 using the throttle actuator based on input from the cruise control module, such as an axle torque request. The CTC module 214 also generates an effective pedal position signal, which represents a throttle position regardless of whether the vehicle operator is depressing the accelerator pedal 293 or the cruise control module is controlling the amount of throttle.

Air mass, volume, and pressure per cylinder may be determined and/or estimated based on signals from the sensors 284, 286. The CTC module 214 may determine a throttle area based on a desired MAP and a desired MAF, and may generate a control signal to control the throttle based on the throttle area. The desired MAP and MAF may be determined based on engine speed and torque request signals.

The CTC system 200 may further include a barometric pressure sensor 308. The barometric pressure sensor 308 may be used to determine environmental conditions, which may be further used to determine a desired throttle area. The desired throttle area may correspond to a specific throttle position.

The fuel management system 201 may also include a memory 320 storing various tables 323, maps 324, firing patterns 326, etc., which may be used while performing the fuel management operations described herein. The tables 323, maps 324 and firing patterns 326 may each be associated with one or more of the operations described with respect to the method of FIG. 4.

The CTC module 214 while performing fuel control management process selects a transmission ratio and a firing fraction to provide based on a cost function, which may be represented by equation 1.

$$\text{Cost} = \frac{\text{Engine\_Fuel\_Rate}}{(\text{Engin\_Power} * \text{Transfer\_Efficiency})} = \frac{1}{\text{Fuel\_Efficiency}} \quad (1)$$

Engine_Fuel_Rate refers to the fuel rate of an engine as a whole at any moment in time and may be measured in grams per second (g/s). Engine_Power may refer to output power of an engine at any moment in time and be measured in kilowatts. Transfer_Efficiency refers to power transfer efficiency of an engine, a torque converter, and a transmission. The transfer efficiency is the efficiency of power transfer from the engine to an output of the transmission. The power transfer efficiency may be measured in grams per second kilowatt (g/skw). The CTC module 214 uses a set of drivability constraints to unsure drive quality while pursuing best fuel efficiency. The drive ability constraints may include the hysteresis and shift ability constraints. Different gears have different torque references for different driveline resonances. To prevent vibrations and/or noises, the drive ability constraints may also include limiting the number of modes (or firing patterns) to a predetermined set of modes that are more stable than other modes, preventing certain combinations of cylinders from being concurrently deactivated, preventing a predetermined order of activating selected ones of the cylinders, preventing a predetermined order of deactivating selected ones of the cylinders, and/or other limitations for noise and vibration reasons. The drive ability constraints may also be provided to prevent hard shifts or "clunky" shifting and thus maintain a high quality driving experience.

Figure 3:
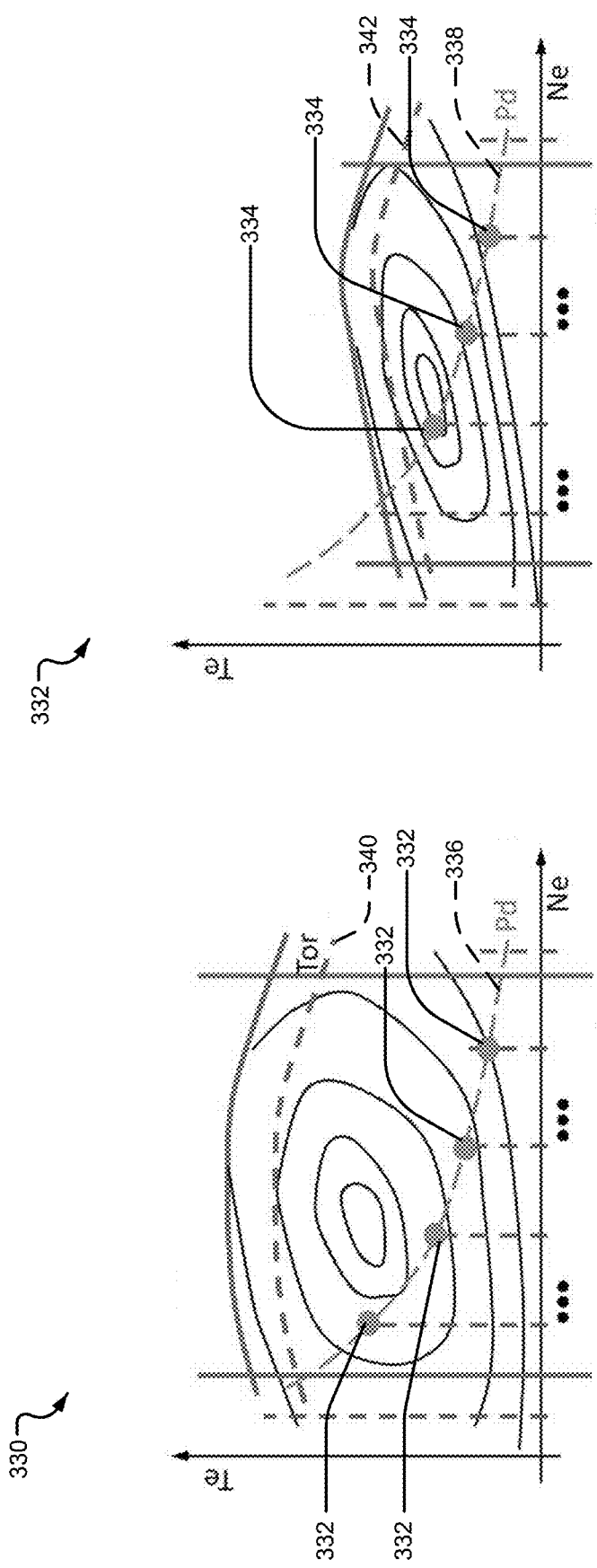
FIG. 3A is an example brake specific fuel consumption map for a first firing fraction illustrating fuel efficiencies for different transmission ratios for a constant transmission output power.
FIG. 3B is an example brake specific fuel consumption map for a second firing fraction illustrating fuel efficiencies for different transmission ratios for a constant transmission output power.

FIGS. 3A and 3B show BSFC maps 330, 332 for a first FF (e.g., 1) and a second FF (e.g., ½) illustrating fuel efficiencies for different transmission ratios for a constant transmission output power. Some of the different transmission ratios are identified with dots 332, 334 along constant transmission output power curves 336, 338. In the examples shown, it is assumed that the transfer efficiency for each transmission gear is the same. If the transfer efficiency is different for different transmission gears, then curves 336, 338 would be different than shown. Although four dots are shown in FIG. 3A, the transmission may have more than four gears. Not all gears are represented by dots in FIGS. 3A and 3B. The BSFC maps 330, 332 also includes torque maximum Te_max curves and engine speed limits Ne_min and Ne_max. FIGS. 3A and 3B also includes torque reserve curves 340, 342.

For the example shown in FIGS. 3A and 3B, the CTC module 214 may select the Xth gear and the FF of ½ rather than selecting the X−1 gear and the FF of 1. This is because, for the example shown, the fuel efficiency is better for the combination pair of the Xth gear and the FF of ½. Traditionally, however, the lower gear and the FF of 1 may have been selected. Note that In FIG. 3B, the lower gear is not suitable for the FF of ½ because the corresponding toque level is higher than Te_max and thus is not selectable. The CTC module 314 selects a FF and transmission ratio that minimizes the cost function to maximize fuel efficiency while satisfying constraints including hysteresis and shift ability constraints.

Figure 4:
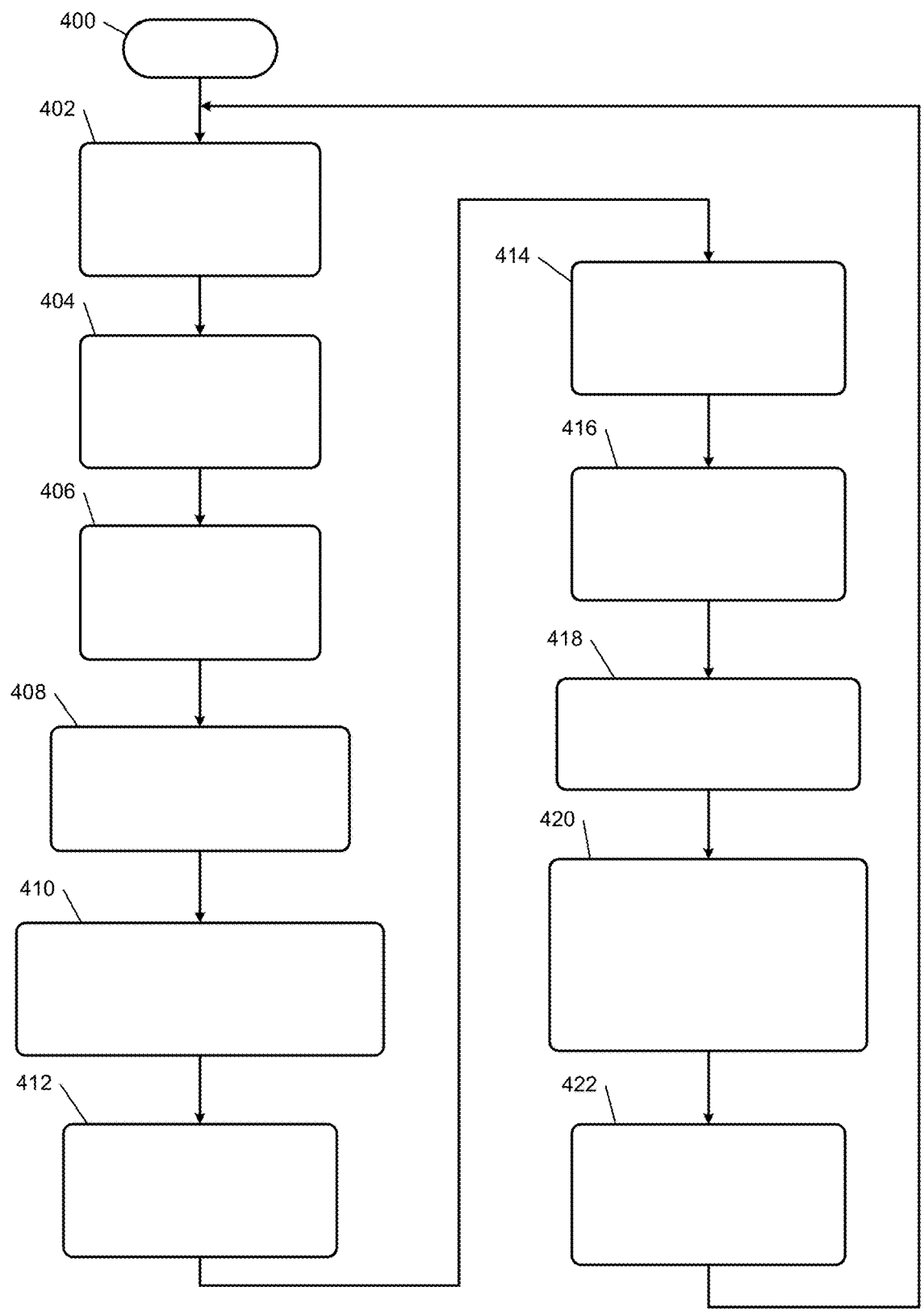
FIG. 4 illustrates a method of operating an engine, a torque converter and a transmission in accordance with the present disclosure.

FIG. 4 illustrates a method of operating an engine, a torque converter and a transmission, such as that shown in FIG. 2. The following operations may be iteratively performed and performed by the CTC module 214 and/or one or more other modules of FIG. 2. The method may begin at 400. At 402, the CTC module 214 may determine vehicle parameters, such as engine speed, vehicle speed, minimum engine output torque to satisfy torque requests (or total requested output torque), and/or other engine, torque converter, and/or transmission related parameters. Although at least some of the parameters are referred to below and accounted for during performance of the following method, other parameters may also be accounted for such as ambient temperature, engine temperature, and/or other parameters, such as the parameters mentioned above.

Figure 5A:
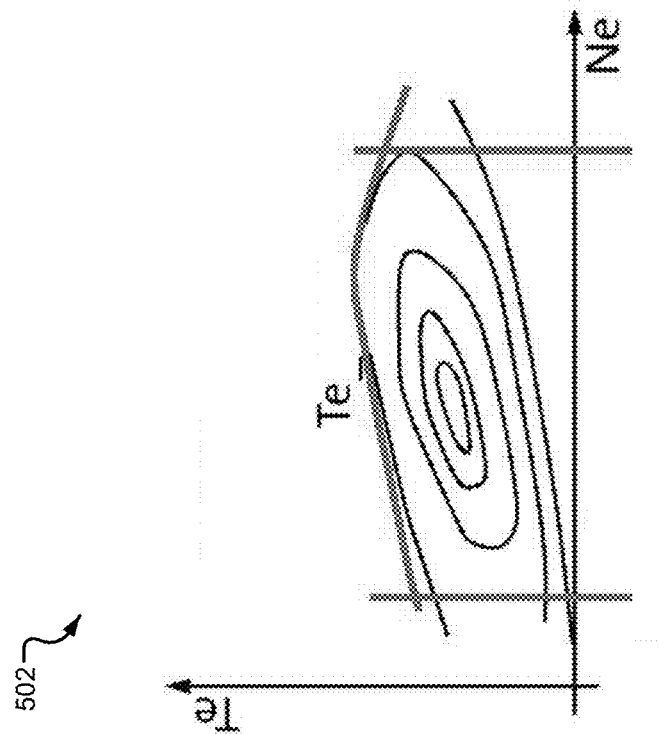
FIG. 5A is an example brake specific fuel consumption map for a first firing fraction with imposed constraints to provide an operable region for the firing fraction.
Figure 5B:
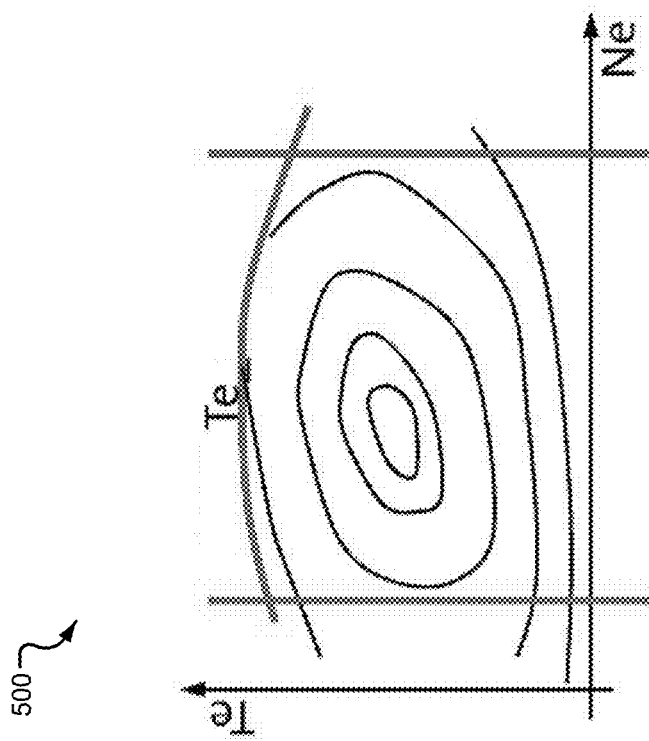
FIG. 5B is an example brake specific fuel consumption map for a first firing fraction with imposed constraints to provide an operable region for the firing fraction.

At 404, the CTC module 214 may impose constraints on engine fuel rate maps (e.g., BSFC maps or other fuel rate related maps) to obtain operable regions for each of multiple different firing fractions. The engine fuel rate maps are provided that satisfy the minimum engine output torque to satisfy the total requested output torque. FIGS. 5A and 5B show example BSFC maps 500, 502 for a first firing fraction (e.g., FF=1) and a second firing fraction (FF=½) with imposed constraints. Although two firing fraction maps are shown, any number of different firing fraction maps may be generated, used and/or modified. The BSFC maps 500, 502 include maximum engine torque curves Te_max, minimum and maximum engine speed limits Ne_min and Ne_max.

At 406, the CTC module 214 may calculate turbine speeds of a turbine (e.g., the turbine 301 of the torque converter 299 of FIG. 2) for respective transmission ratios (or gears) for a current vehicle speed. As a result, a vector of n turbine speeds are obtained, where n is the number of transmission ratios (or gears). Table 1 is an example of different turbine speeds provided for different transmission ratios.

TABLE 1

Turbine Speeds for Transmission Gears

| Transmission Ratio (or Gear) | Turbine Speed |
|---|---|
| 1 | 3000 |
| . | . |
| . | . |
| . | . |
| N | 600 |

The ellipsis in Tables 1-6 refer to different transmission ratios and/or gears and corresponding parameters. In Tables 1-6, the values 1-n may refer to different transmission gears and/or transmission ratios, where n is the total number of gears and/or the total number of transmission ratios available to select from.

At 408, the CTC module determines turbine torque values corresponding to the turbine speeds obtained at 406 that satisfy a driver's power demand and/or the requested torque. As a result, a vector of n turbine torque values are obtained. Table 2 is an example of different turbine torque values for different turbine speeds provided for the different transmission ratios.

TABLE 2

Turbine Torques for Turbine Speeds

| Transmission Ratio (or Gear) | Turbine Speed | Turbine Torque |
|---|---|---|
| 1 | 3000 | 36 |
| . | . | . |
| . | . | . |
| . | . | . |
| n | 600 | 180 |

At 410, the CTC module 214 may, for each FF, add the corresponding achievable TCC slip to the turbine speeds obtained above to obtain respective engine speeds. This is done while maintaining a same value of turbine torque. Engine torque values may be determined based on the turbine torque values and for simplicity of explanation the engine torque values are set equal to the turbine torque values. As a result n*m pairs of engine speeds and engine torques are obtained, where m is the number of firing fractions. Table 3 shows example engine speeds and engine torques.

TABLE 3

Engine Speed and Torque for Firing Fraction and Transmission Gear

| Firing Fraction | Transmission Ratio (or Gear) | Engine Speed | Engine Torque |
|---|---|---|---|
| 1 | 1 | 3000 | 36 |
|  | . | . | . |
|  | . | . | . |
|  | n | 600 | 180 |
| . |  |  |  |
| . |  |  |  |
| . |  |  |  |
| ½ | 1 | 3005 | 36 |
|  | . | . | . |
|  | . | . | . |
|  | n | 605 | 180 |
| . |  |  |  |
| . |  |  |  |
| . |  |  |  |
| ¼ | 1 | 3007 | 36 |
|  | . | . | . |
|  | . | . | . |
|  | n | 607 | 180 |
| . |  |  |  |
| . |  |  |  |
| . |  |  |  |

At 412, the CTC module 214 determines fuel rates using engine fuel rate maps for respective firing fractions and for the pairs of engine speeds and engine torques obtained at 410. If the engine speed and engine torque pair is out of an operable range, then an infinite (or large) value is assigned. An example of this is shown in Table 4, which includes fuel rates for the engine speed and engine torque pairs obtained at operation 410. The fuel rate for the FF of ½ and the nth transmission gear is outside of an operable range and thus the fuel rate value is set to a high predetermined default fuel rate value (e.g., 100000). Performance of operation 412 provides n*m fuel rate values.

TABLE 4

Engine Fuel Rates for Engine Speeds and Torques

| Firing Fraction | Transmission Ratio (or Gear) | Engine Speed | Engine Torque | Fuel Rate |
|---|---|---|---|---|
| 1 | 1 | 3000 | 36 | 8 |
|  | . | . | . |  |
|  | . | . | . |  |
|  | n | 600 | 180 | 7 |
| . |  |  |  |  |
| . |  |  |  |  |
| ½ | 1 | 3005 | 36 | 7.9 |
|  | . | . | . |  |
|  | . | . | . |  |
|  | n | 605 | 180 | 100000 |
| . |  |  |  |  |
| . |  |  |  |  |
| ¼ | 1 | 3007 | 36 | 7.8 |
|  | . | . | . |  |
|  | . | . | . |  |
|  | n | 607 | 180 | 7.4 |
| . |  |  |  |  |
| . |  |  |  |  |

At 414, the CTC module 214 determines the power transfer efficiency corresponding to each engine speed and torque pair. The power transfer efficiency, as defined above, refers to the transfer efficiency of power from the engine to an output of the transmission. Table 5 includes transfer efficiency values for the engine speed and torque pairs.

TABLE 5

Transfer Efficiency Values for Engine Speeds and Torques

| Firing Fraction | Transmission Ratio (or Gear) | Engine Speed | Engine Torque | Fuel Rate | Transfer Efficiency |
|---|---|---|---|---|---|
| 1 | 1 | 3000 | 36 | 8 | 0.91 |
|  | . | . | . |  |  |
|  | . | . | . |  |  |
|  | n | 600 | 180 | 7 | 0.94 |
| . |  |  |  |  |  |
| . |  |  |  |  |  |
| ½ | 1 | 3005 | 36 | 7.9 | 0.9 |
|  | . | . | . |  |  |
|  | . | . | . |  |  |
|  | n | 605 | 180 | 100000 | 0.91 |
| . |  |  |  |  |  |
| . |  |  |  |  |  |
| ¼ | 1 | 3007 | 36 | 7.8 | 0.9 |
|  | . | . | . |  |  |
|  | . | . | . |  |  |
|  | n | 607 | 180 | 7.4 | 0.91 |
| . |  |  |  |  |  |
| . |  |  |  |  |  |

At 416, the CTC module 214 calculates fuel efficiency values corresponding to each of the power transfer efficiency values. The fuel efficiency values may be determined using, for example, equation 2.

$$\text{engine\_speed} * \text{engine\_torque} * \frac{\text{transfer\_efficiency}}{\text{fuel\_rate}} \quad (2)$$

Table 6 includes example fuel efficiency values.

TABLE 6

Transfer Efficiency Values for Engine Speeds and Torques

| Firing Fraction | Transmission Ratio (or Gear) | Engine Speed | Engine Torque | Fuel Rate | Transfer Efficiency | Fuel Efficiency |
|---|---|---|---|---|---|---|
| 1 | 1 | 3000 | 36 | 8 | 0.91 | 7.28 |
| . | . | . | . |  |  |  |
| . | . | . | . |  |  |  |
| . | . | . | . |  |  |  |
|  | n | 600 | 180 | 7 | 0.94 | 14,503 |
| . |  |  |  |  |  |  |
| . |  |  |  |  |  |  |
| ½ | 1 | 3005 | 36 | 7.9 | 0.9 | 12,324 |
| . | . | . | . |  |  |  |
| . | . | . | . |  |  |  |
| . | . | . | . |  |  |  |
|  | n | 605 | 180 | 100000 | 0.91 | 0.99 |
| . |  |  |  |  |  |  |
| . |  |  |  |  |  |  |
| ¼ | 1 | 3007 | 36 | 7.8 | 0.9 | 12,491 |
| . | . | . | . |  |  |  |
| . | . | . | . |  |  |  |
| . | . | . | . |  |  |  |
|  | n | 607 | 180 | 7.4 | 0.91 | 13,436 |
| . |  |  |  |  |  |  |
| . |  |  |  |  |  |  |
| . |  |  |  |  |  |  |

At 418, the CTC module 214 orders the parameter sets (e.g., parameter values in each row of Table 6) based on fuel efficiency. The parameter sets may be ordered in terms of fuel efficiency from high to low.

At 420, the CTC module 214 applies hysteresis and shift ability constraints and/or other drive ability constraints to the ordered parameter sets. This may include removing parameter sets that do not satisfy the constraints and reordering remaining parameter sets based on the fuel efficiency values.

At 422, the CTC module 214 selects one of the remaining transmission ratio and firing fraction pairs that (i) satisfies the minimum engine output torque to satisfy the total requested output torque, and (ii) has the best (or maximum) fuel efficiency relative to the other remaining transmission ratio and firing fraction pairs. The CTC module 214 may signal the transmission control module 294 to transition to the transmission ratio (or gear) of the selected pair if not already operation at that ratio (or in that gear). The CTC module 214 may also signal the spark actuator module 226 to follow a firing pattern associated with the selected firing fraction. The signaling of the modules 294 and 226 may happen concurrently. Operation 402 may be performed subsequent to operation 422.

The above described examples enlarge the optimization space in which transmission ratio and firing fractions pairs are selected and as a result provide improved fuel efficiency.

The disclosed fuel management system may (i) select transmission ratio and firing fraction pairs not traditionally selected, and/or (ii) operate with particular transmission ratio and firing fraction pairs during conditions in which traditionally other less fuel efficient transmission gear and firing fraction pairs may have been selected.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A fuel management system comprising:
a memory configured to store m fuel rate maps respectively for m firing fractions, wherein each of the m firing fractions corresponds to a respective firing pattern for a plurality of cylinders of an engine of a vehicle, wherein at least some of the firing patterns include deactivating one or more of the plurality of cylinders, and where m is an integer greater than or equal to two; and
a control module configured to
for each of the m firing fractions, determine a fuel efficiency value for each of n transmission gear ratios, wherein n*m fuel efficiency values are provided for n*m transmission ratio and firing fraction pairs,
applying a plurality of drive ability constraints to the n*m transmission ratio and firing fraction pairs to provide resultant transmission ratio and firing fraction pairs,
subsequent to applying the plurality of drive ability constraints and based on the fuel efficiency values of the resultant transmission ratio and firing fraction pairs, select one of the resultant transmission ratio and firing fraction pairs, and
concurrently operate a transmission and the engine according to the selected one of the plurality of transmission ratio and firing fraction pairs.

2. The fuel management system of claim 1, wherein:
the control module is configured to select the one of the resultant transmission ratio and firing fraction pairs based on a cost function, which is directly related to fuel efficiency; and
the cost function is based on a fuel rate, an engine power, and a transfer efficiency.

3. The fuel management system of claim 1, wherein the control module is configured to:
for each of the m firing fractions, determine a transfer efficiency value for each of the n transmission gear ratios; and
determine each of the n*m fuel efficiency values based on a respective one of the transfer efficiency values.

4. The fuel management system of claim 3, wherein the control module is configured to determine each of the transfer efficiency values based on a respective engine speed and engine torque pair.

5. The fuel management system of claim 1, wherein the control module is configured to:
for each of the m firing fractions, determine a fuel rate for each of the n transmission gear ratios; and
determine each of the n*m fuel efficiency values based on a respective one of the fuel rates.

6. The fuel management system of claim 5, wherein the control module is configured to determine each of the fuel rates based on a respective one of a plurality of engine speed and engine torque pairs.

7. The fuel management system of claim 6, wherein the control module is configured to:
in response to determining one of the plurality of engine speed and engine torque pairs is outside of an operable range, assign a predetermined default fuel rate value for a corresponding one of the n*m transmission ratio and firing fraction pairs; and
refrain from selecting the one of the n*m transmission ratio and firing fraction pairs based on the predetermined default fuel rate value.

8. The fuel management system of claim 1, wherein the control module is configured to:
for each of the m firing fractions, determine an engine speed and engine torque pair for each of the n transmission gear ratios;
determine a transfer efficiency value for each of the engine speed and engine torque pairs; and
determine the n*m fuel efficiency values based respectively on the transfer efficiency values.

9. The fuel management system of claim 1, wherein the control module is configured to:
determine a turbine speed and turbine torque pair of a torque converter for each of the n transmission gear ratios;
for each of the m firing fractions and based on an amount of torque converter slip and the turbine speed and turbine torque pairs, determine an engine speed and engine torque pair for each of the n transmission gear ratios;
determine a transfer efficiency value for each of the engine speed and engine torque pairs; and
determine the n*m fuel efficiency values based respectively on the transfer efficiency values.

10. The fuel management system of claim 1, wherein the plurality of drive ability constraints comprise at least one of:
limiting output torque to a maximum amount of engine output torque;
limiting, for each of the m firing fractions, engine speed to be within a range between a minimum engine speed and a maximum engine speed;
preventing concurrent deactivation of a predetermined combination of the plurality of cylinders;
preventing a predetermined order of activating selected ones of the plurality of cylinders; or
preventing a predetermined order of deactivating selected ones of the plurality of cylinders.

11. A fuel management method comprising:
storing in a memory m fuel rate maps respectively for m firing fractions, wherein each of the m firing fractions corresponds to a respective firing pattern for a plurality of cylinders of an engine of a vehicle, wherein at least some of the firing patterns include deactivating one or more of the plurality of cylinders, and where m is an integer greater than or equal to two;
for each of the m firing fractions, determining a fuel efficiency value for each of n transmission gear ratios, wherein n*m fuel efficiency values are provided for n*m transmission ratio and firing fraction pairs;
applying a plurality of drive ability constraints to the n*m transmission ratio and firing fraction pairs to provide resultant transmission ratio and firing fraction pairs;
subsequent to applying the plurality of drive ability constraints and based on the fuel efficiency values of the resultant transmission ratio and firing fraction pairs, selecting one of the resultant transmission ratio and firing fraction pairs; and
concurrently operating a transmission and the engine according to the selected one of the plurality of transmission ratio and firing fraction pairs.

12. The fuel management method of claim 11, further comprising selecting the one of the resultant transmission ratio and firing fraction pairs based on a cost function, which is directly related to fuel efficiency,
wherein the cost function is based on a fuel rate, an engine power, and a transfer efficiency.

13. The fuel management method of claim 11, further comprising:
for each of the m firing fractions, determining a transfer efficiency value for each of the n transmission gear ratios; and
determining each of the n*m fuel efficiency values based on a respective one of the transfer efficiency values.

14. The fuel management method of claim 13, further comprising determining each of the transfer efficiency values based on a respective engine speed and an engine torque pair.

15. The fuel management method of claim 11, further comprising:
for each of the m firing fractions, determining a fuel rate for each of the n transmission gear ratios; and
determining each of the n*m fuel efficiency values based on a respective one of the fuel rates.

16. The fuel management method of claim 15, further comprising determining each of the fuel rates for a respective one of a plurality of engine speed and engine torque pairs.

17. The fuel management method of claim 16, further comprising:
in response to determining one of the plurality of engine speed and engine torque pairs is outside of an operable range, assigning a predetermined default fuel rate value for a corresponding one of the n*m transmission ratio and firing fraction pairs; and
refraining from selecting the one of the n*m transmission ratio and firing fraction pairs based on the predetermined default fuel rate value.

18. The fuel management method of claim 11, further comprising:
for each of the m firing fractions, determining an engine speed and engine torque pair for each of the n transmission gear ratios;
determining a transfer efficiency value for each of the engine speed and engine torque pairs; and
determining the n*m fuel efficiency values based respectively on the transfer efficiency values.

19. The fuel management method of claim 11, further comprising:
determining a turbine speed and turbine torque pair of a torque converter for each of the n transmission gear ratios;
for each of the m firing fractions and based on an amount of torque converter slip and the turbine speed and turbine torque pairs, determining an engine speed and engine torque pair for each of the n transmission gear ratios;
determining a transfer efficiency value for each of the engine speed and engine torque pairs; and
determining the n*m fuel efficiency values based respectively on the transfer efficiency values.

20. The fuel management method of claim 11, wherein the plurality of drive ability constraints comprise at least one of:
- limiting output torque to a maximum amount of engine output torque;
- limiting, for each of the m firing fractions, engine speed to be within a range between a minimum engine speed and a maximum engine speed;
- preventing concurrent deactivation of a predetermined combination of the plurality of cylinders;
- preventing a predetermined order of activating selected ones of the plurality of cylinders; or
- preventing a predetermined order of deactivating selected ones of the plurality of cylinders.

* * * * *